United States Patent
Andersen (10) Patent No.: US 9,377,141 B2
(45) Date of Patent: Jun. 28, 2016

(54) ADJUSTABLE CLAMP USING STANDARDIZED TOOL

(71) Applicant: Builder's Best, Inc., Jacksonville, TX (US)

(72) Inventor: John L. Andersen, Jacksonville, TX (US)

(73) Assignee: Builder's Best, Inc., Jacksonville, TX (US)

( * ) Notice: Subject to any disclaimer, the term of this patent is extended or adjusted under 35 U.S.C. 154(b) by 239 days.

(21) Appl. No.: 14/278,391

(22) Filed: May 15, 2014

(65) Prior Publication Data

US 2015/0330547 A1   Nov. 19, 2015

(51) Int. Cl.
*F16L 33/035* (2006.01)
*F16L 33/10* (2006.01)
*F16L 33/04* (2006.01)
*B65D 63/10* (2006.01)
*F16L 3/233* (2006.01)
*F16L 33/08* (2006.01)

(52) U.S. Cl.
CPC .............. *F16L 33/035* (2013.01); *F16L 33/04* (2013.01); *F16L 33/10* (2013.01); *B65D 63/1072* (2013.01); *F16L 3/2334* (2013.01); *F16L 33/08* (2013.01); *Y10T 24/141* (2015.01); *Y10T 24/1427* (2015.01); *Y10T 24/1498* (2015.01); *Y10T 29/49828* (2015.01)

(58) Field of Classification Search
CPC . Y10T 24/1498; Y10T 24/141; Y10T 24/142; Y10T 24/1422; Y10T 24/1482; Y10T 24/1406; Y10T 24/1427; Y10T 24/1429; Y10T 24/1431; B65D 63/1045; B65D 63/1072; F16L 33/035; F16L 3/2334; F16L 33/04

See application file for complete search history.

(56) References Cited

U.S. PATENT DOCUMENTS

| | | | | | |
|---|---|---|---|---|---|
| 1,874,731 | A | * | 8/1932 | Younce | B25B 27/12 24/269 |
| 3,808,643 | A | * | 5/1974 | Gouge | B65D 63/14 24/19 |
| 3,981,049 | A | * | 9/1976 | Oetiker | B25B 25/005 24/20 TT |
| 4,447,934 | A | * | 5/1984 | Anscher | F16L 3/233 24/16 PB |
| 4,546,524 | A | * | 10/1985 | Kreft | F16L 33/02 24/19 |
| 5,257,439 | A | * | 11/1993 | LeBlanc | A61C 7/18 24/269 |
| 2011/0271492 | A1 | * | 11/2011 | Posner | F16L 33/035 24/16 R |
| 2012/0047692 | A1 | * | 3/2012 | Stoll | F16L 33/08 24/274 WB |

* cited by examiner

*Primary Examiner* — Robert J Sandy
*Assistant Examiner* — Michael Lee
(74) *Attorney, Agent, or Firm* — Price Heneveld LLP (57) ABSTRACT

An adjustable clamp includes a tool-motivated adjustment mechanism. The adjustable clamp includes a head having a base, a top, a front, and first and second sides that define a cavity, and a strap extending from the head having teeth spaced apart a first distance on at least one surface. The first and second sides have openings that allow the strap to extend therethrough. A pair of tabs depend from the head and are spaced apart a second distance, the second distance being about half the first distance. The pair of tabs selectively engage the teeth. An aperture within the head is configured to allow entry of a tool therethrough at a predetermined angle relative to the base to engage the teeth disposed in the cavity such that the rotational movement of a tool in at least one direction selectively changes the position of the strap relative to the head.

22 Claims, 6 Drawing Sheets

ADJUSTABLE CLAMP USING STANDARDIZED TOOL

BACKGROUND OF THE INVENTION

The present invention generally relates to adjustable clamps, and more specifically, to a clamp that can be adjusted through the use of a standardized tool.

SUMMARY OF THE INVENTION

In one aspect, an adjustable clamp includes a head having a base, a top, a front, a first side and a second side that cooperate to define a cavity. A strap is included that extends from the head, where the strap has a plurality of teeth on at least one surface, and where the plurality of teeth are spaced a first distance from one another. The first side and the second side of the head each have an opening configured to allow the strap to extend therethrough. At least a pair of tabs depends from the head, wherein the at least a pair of tabs are spaced a second distance from one another where the second distance is half the first distance. The at least a pair of tabs are configured to selectively engage at least one of a plurality of teeth. An aperture is configured within the head to allow entry of a tool therethrough at a predetermined angle relative to the base of the head so as to engage at least one of the plurality of teeth selectively disposed in the cavity such that the rotational movement of a tool in at least one direction selectively changes the position of the strap relative to the head.

In another aspect, an adjustable clamp includes a head having a front, a first side and a second side, wherein the front includes an aperture. A strap is included that extends from the first side of the head, and has teeth on at least one surface, wherein the teeth are spaced a first distance from one another. The aperture of the front is configured to allow entry of a tool therein at a predetermined angle relative to a base of the head to selectively engage the teeth of the strap in a rack-and-pinion configuration, and wherein the predetermined angle is between about 15° and about 40°. Openings are included in the first and second sides, wherein the openings are sized to allow the strap to extend therethrough such that the teeth engage at least a portion of the head to define a selective interference connection.

In yet another aspect, a method of adjusting a clamp includes the steps of providing a clamp having a head that includes a base, a top, a front having an aperture, a first side and a second side, wherein the first and second sides each include an opening. A strap extends from the head, and has a plurality of teeth on at least one surface of the strap, wherein the plurality of teeth are spaced a first distance from one another. The first and second sides each have an opening sized so that the strap can extend therethrough. At least a pair of tabs depend from the head proximate the opening of one of the first and second sides, wherein the at least a pair of tabs are spaced a second distance, the second distance being about half the first distance, and wherein the at least a pair of tabs are configured to selectively engage at least one of the plurality of teeth. The method also includes the step of wrapping the clamp around an object and causing the plurality of teeth of the strap to come in contact with the at least a pair of tabs by inserting the strap into the opening of the second side of the head, then inserting the strap into the opening of the first side of the head. The method also includes the step of inserting a tool into the aperture at a predetermined angle relative to the base of the head, wherein the tool abuts a guide surface of the head disposed at a predetermined angle, and wherein the selective engagement of the tool within the aperture at the predetermined angle with the plurality of teeth defines a selectively adjustable rack-and-pinion connection. The method also includes the step of motivating the tool to engage the plurality of teeth of the strap to adjust the position of the strap relative to the head.

These and other features, advantages, and objects of the present invention will be further understood and appreciated by those skilled in the art by reference to the following specification, claims, and appended drawings.

DETAILED DESCRIPTION OF THE EMBODIMENTS

Figure 1:
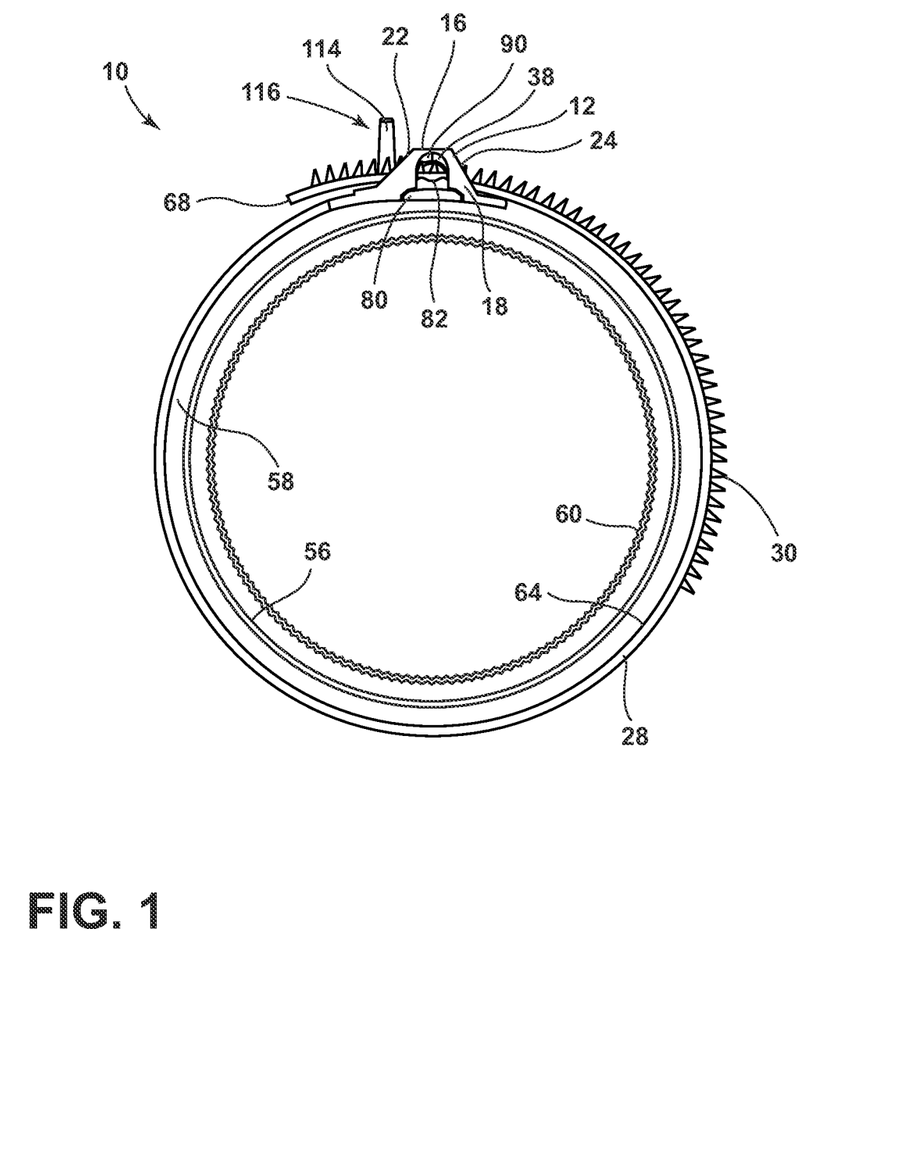
FIG. 1 is a first side elevational view of one embodiment of the adjustable clamp surrounding a tubular members.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
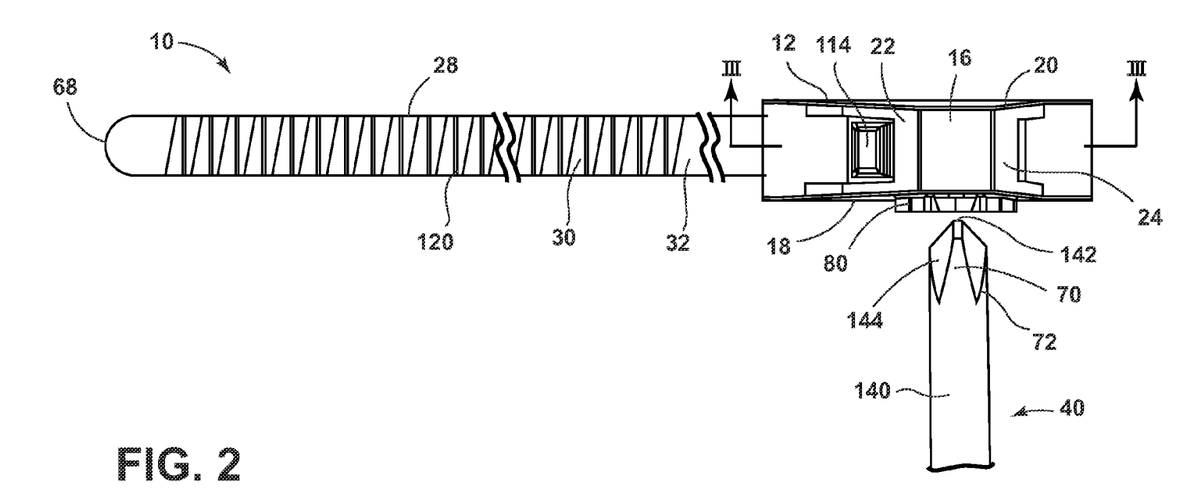
FIG. 2 is a top elevational view of an alternate embodiment of the adjustable clamp having angled teeth.
Figure 3:
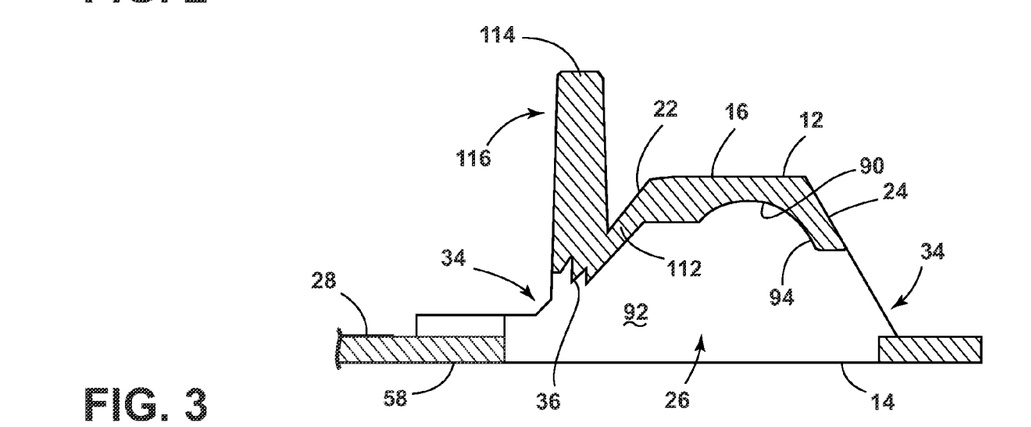
FIG. 3 is a cross-sectional view of the adjustable clamp of FIG. 2 taken at line III-III.

As illustrated in FIGS. 1-3, the reference numeral 10 generally refers to an adjustable clamp having a tool-motivated adjustment mechanism. The adjustable clamp 10 includes a head 12 having a base 14, a top 16, a front 18, a back 20, a first side 22 and a second side 24 that cooperate to define a cavity 26. A strap 28 extends from the head 12 and includes a plurality of teeth 30 on at least one surface 32 of the strap 28, wherein the plurality of teeth 30 are spaced a first distance from one another. The first side 22 and the second side 24 of the head 12 each have an opening 34 configured to allow the strap 28 to extend therethrough. At least a pair of tabs 36 depend from the head 12, wherein the tabs 36 are spaced a second distance from one another, and wherein the second distance is about half the first distance. The tabs 36 depending from the head 12 are configured to selectively engage at least one of the plurality of teeth 30. An aperture 38 is defined by the head 12 and is configured to allow entry of a tool 40 therethrough at a predetermined angle α (shown in FIG. 6) relative to the base 14 of the head 12 so as to engage at least one of the plurality of teeth 30 selectively disposed in the cavity 26. In this manner, the rotational movement of a tool 40 in at least one direction selectively changes the lateral position of the strap 28 relative to the head 12.

Referring again to FIGS. 1-3, the adjustable clamp 10 is configured to be placed around at least two substantially tubular members 56, 60, each having arcuate cross-sections that can include, but are not limited to, round, elliptical, egg-shaped, irregular, or other arcuate tubular cross-sections. One tubular member 56, typically a piece of flexible duct, is placed around another tubular member 60, typically made of a substantially rigid material such as metal, plastic, or other similar substantially rigid material, wherein the one tubular member 60 may be substantially rigid, but is relatively deformable with respect to the tubular member 60. The adjustable clamp 10 is then placed around the larger of the two tubular members 56, where an end 68 of the strap 28 of the adjustable clamp 10 is placed through the head 12 of the adjustable clamp 10 in an inward direction 62, such that the plurality of teeth 30 disposed on the strap 28 engage the tabs 36 depending from the head 12. Because the tabs 36 are spaced half the distance apart as the teeth 30 of the strap 28, the strap 28 can be moved through the head 12 in increments that are one-half the distance between the teeth 30. In this manner, finite adjustment can be made as to the tightness of the strap 28 around the tubular members 56, 60 that are to be coupled. It is noted that the spacing of the tabs 36 may further be adjusted to provide additional finite adjustment.

As further illustrated in FIG. 1, the strap 28 extends from the first side 22 of the head 12. An end 68 of the strap 28 can be placed into the opening 34 at the second side 24 of the head 12, through the cavity 26, then out of the head 12 through the opening 34 in the first side 22 of the head 12, so that the bottom surface 58 of the adjustable clamp 10 defines a circumference 64. As the strap 28 is inserted in the inward direction 62, portions of the strap 28 move through the opening 34 in the second side 24, through the cavity 26, and out the opening 34 in the first side 22. The movement of the strap 28 in the inward direction 62 results in the circumference 64 becoming smaller, thereby tightening the clamp 10 around the tubular members 56, 60 to be secured. Alternatively, the strap 28 can be selectively moved in an outward direction 66, wherein the outward direction 66 is opposite of the inward direction 62. The movement of the strap 28 in the outward direction 66 results in the circumference 64 becoming larger, thereby loosening the strap 28 around tubular members 56, 60. Ultimately, the strap 28 can be removed from the head 12 if the strap 28 is moved in the outward direction 66 a sufficient distance such that the end 68 of the strap 28 is removed from the head 12. Once the strap 28 is removed from the head 12, the adjustable clamp 10 can be removed from the tubular members 56, 60 for later use. Details as to the movement of the strap 28 through the head 12 of the adjustable clamp 10 will be described in greater detail below.

As illustrated in FIGS. 2 and 4-6 of the illustrated embodiment, a tool 40 having vanes disposed at an end 72 of the tool 40 can be inserted into the aperture 38 defined within the head 12 such that the vanes 70 of the end 72 of the tool 40 can engage the plurality of teeth 30 of the strap 28. The teeth 30 of the strap 28 are configured such that the selective engagement of the tool 40 with the teeth 30 disposed within the cavity 26 defines a rack-and-pinion connection between the vanes 70 of the tool 40 and the teeth 30 when the tool 40 is disposed within the aperture 38 at the predetermined angle α. In order to support the tool 40 at the predetermined angle α, the head 12 includes a support portion 80 positioned proximate the aperture 38. The support portion 80 is configured to support a tool 40 placed within the aperture 38 at the predetermined angle α. The support portion 80 includes a relatively widened portion of the front 18 of the head 12 where the widened portion supports the insertion and rotation of the tool 40 within the aperture 38 and substantially prevents the front 18 of the head 12 from being substantially compressed, deformed, or otherwise damaged by the use of the tool 40 within the head 12. The support portion 80 extends from the base 14 of the head 12 up to the bottom 82 of the aperture 38 and has a height sufficient such that when the tool 40 is inserted into the head 12, and the vanes 70 of the tool 40 engage the plurality of teeth 30 within the head 12, the support portion 80 assists in positioning the tool 40 at the predetermined angle α.

Figure 4:
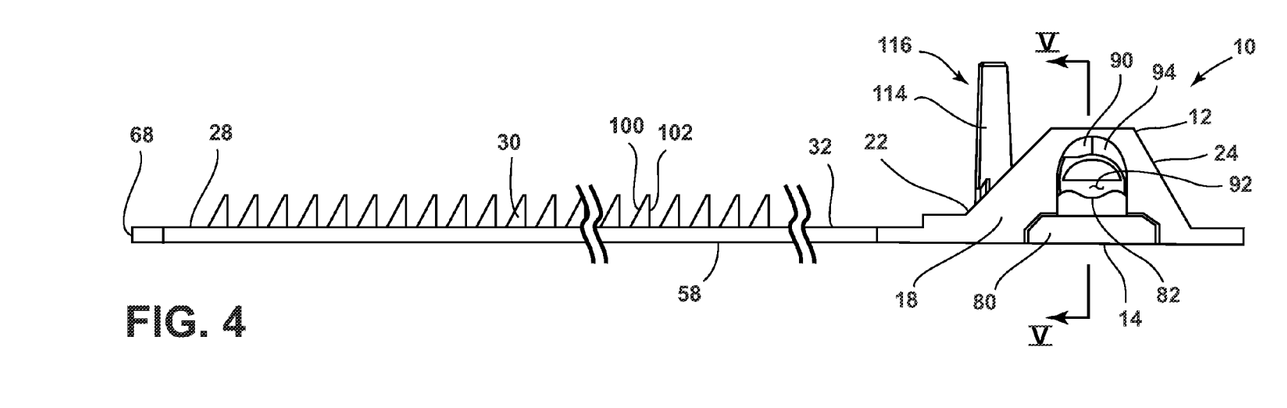
FIG. 4 is a side elevational view of the embodiment of FIG. 2.
Figure 5:
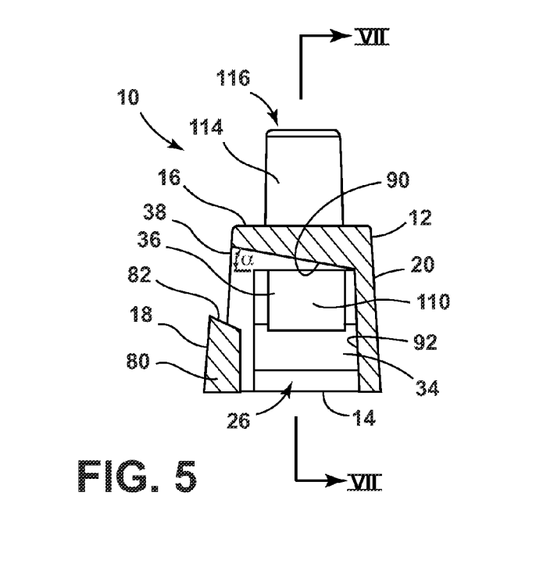
FIG. 5 is a cross-sectional view of the adjustable clamp of FIG. 4, taken at line V-V.
Figure 6:
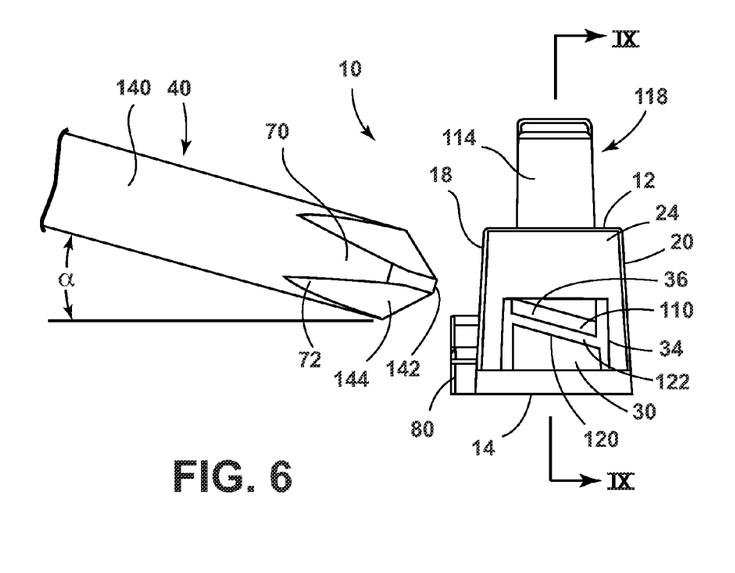
FIG. 6 is a third side elevational view of another alternate embodiment of the adjustable clamp with the release member in the release position.

As further shown in FIGS. 4-6 of the illustrated embodiment, the head 12 also includes a guide surface 90 disposed on a portion of the inner surface 92 of the head 12. The guide surface 90 is positioned above the aperture 38 and extends downward and away from the aperture 38 at the predetermined angle α. In this way, the portion of the head 12 proximate the guide surface 90, as with the support portion 80, is a thickened portion of the head 12 that serves to support the placement of the tool 40 within the aperture 38 at the predetermined angle α. The guide surface 90 also includes an arcuate portion 94 that has a curvature substantially similar to that of the tool 40 to be inserted within the aperture 38. In this manner, the guide surface 90 and the support portion 80 cooperate to maintain the position of the tool 40 within the aperture 38 of the head 12 at the predetermined angle α. This cooperative arrangement substantially prevents the tool 40 from rotating away from the predetermined angle α and out of engagement with the plurality of teeth 30 of the strap 28. The support portion 80 and the guide surface 90 substantially limit the movement of the tool 40 to either an in- or out-motion through the aperture 38 and a rotational movement about a rotational axis disposed at the predetermined angle α.

Figure 7:
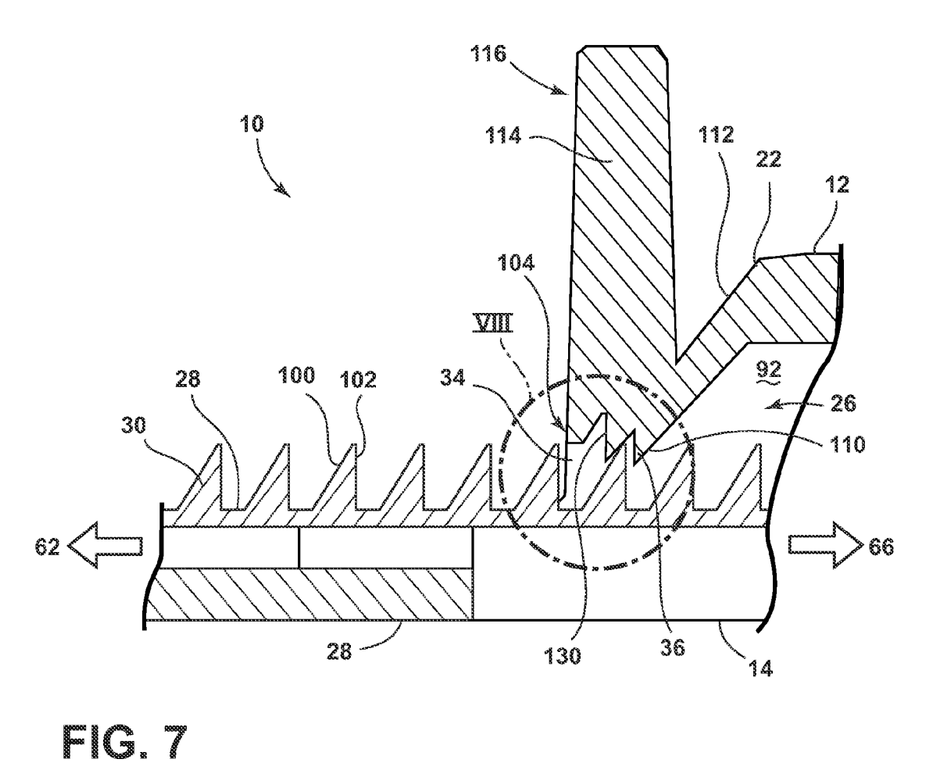
FIG. 7 is a detail sectional view of the adjustable clamp of FIG. 6, taken at line VII-VII, with the teeth of the strap in a first position.
Figure 8:
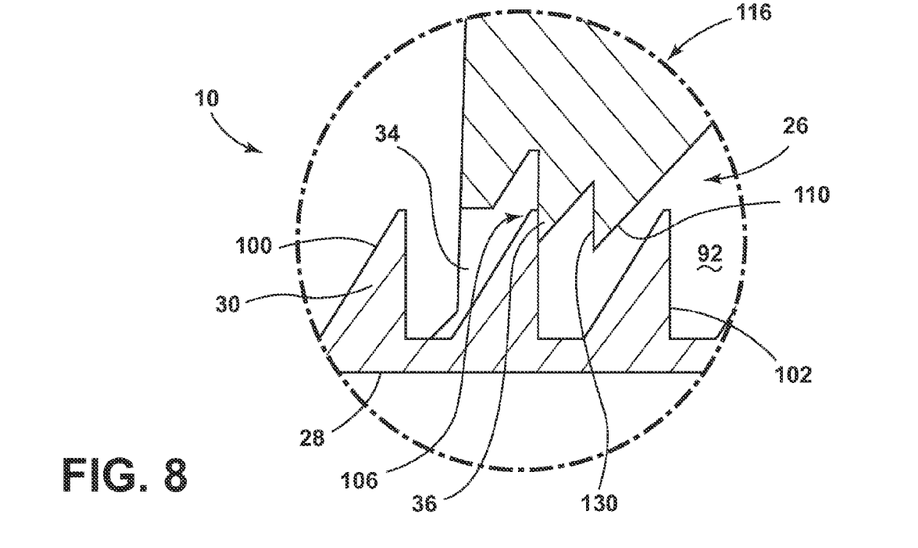
FIG. 8 is a detail sectional view of the adjustable clamp of FIG. 7, taken at area VIII, with the teeth of the strap in a second position.
Figure 9:
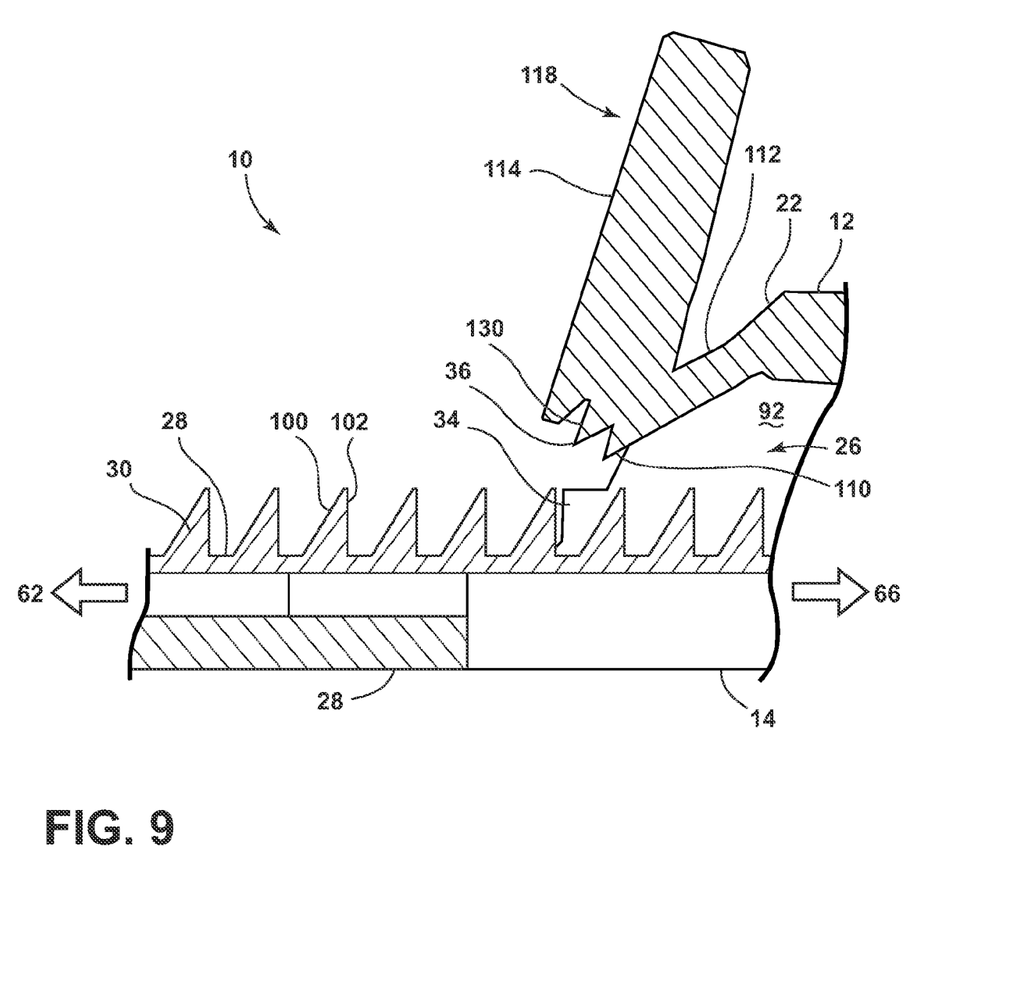
FIG. 9 is a cross-sectional view of the embodiment of FIG. 6, taken at line IX-IX, with the release member in the release position.

Referring now to FIGS. 7-9 of the illustrated embodiment, the tabs 36 that depend from the inner surface 92 of the head 12 are located within the cavity 26 of the head 12 and are configured to engage the plurality of teeth 30 as the strap 28 is moved through the head 12 of the adjustable clamp 10. The pairs of tabs 36 can be disposed proximate the opening 34 of one of the first and second sides 22, 24. Each of the plurality of teeth 30 includes an angled leading surface 100 that is configured to displace each of the tabs 36 when the strap 28 passes into one of the openings 34 and through the cavity 26 in the inward direction 62 to decrease the circumference 64 and tighten the clamp 10 around a tubular member 56, 60. In addition, each of the plurality of teeth 30 includes a trailing surface 102 that is positioned substantially normal to the at least one surface 32 of the strap 28 on which the plurality of teeth 30 are disposed. The trailing surface 102 of each of the plurality of teeth 30 is configured to engage at least one of the pair of tabs 36 to selectively prevent the movement of the strap 28 in an outward direction 66, thereby selectively preventing the loosening of the clamp 10 around the secured tubular member 56, 60.

As further illustrated in FIGS. 6-9, the trailing surface 102 is also configured to cooperate with the vanes 70 of the tool 40 that is inserted into the aperture 38 to permit the lateral adjustment of the strap 28 in the inward direction 62 when the tool 40 is disposed within the aperture 38 at the predetermined angle α. The trailing surface 102 of each of the teeth 30 is configured to receive the vanes 70 of the tool 40 inserted into the aperture 38 at the predetermined angle α. The trailing surfaces 102 are spaced apart at a distance substantially equivalent to the radial distance between the vanes 70 of the tool 40. In this manner, the rotational movement of the vanes 70 of the tool 40 within the aperture 38 matches the lateral movement of the teeth 30 through the head 12, thereby creating the rack-and-pinion relationship between the vanes 70 of the tool 40 and the teeth 30 on the strap 28, as described above.

Referring again to FIGS. 7-9, each of the pair of tabs 36 that depend from an inner surface 92 of the head 12 includes an angled biasing surface 110 that cooperates with the leading surface 100 of each of the plurality of teeth 30 to displace the at least a pair of tabs 36 when the strap 28 is moved through the cavity 26 in the inward direction 62. The tabs 36 are disposed proximate a thinned portion 112 of the head 12 and a release member 114 such that the release member 114 is in communication with the tabs 36. In various embodiments, the thinned portion 112 is a living hinge that allows the release member 114 to be manipulated to move the tabs 36 between interference and release positions 116, 118. The interference position 116 is defined by the at least a pair of tabs 36 at least partially interfering with the selective movement of the strap 28 through the cavity 26. The release position 118 is defined by the selective movement of the strap 28 through the cavity 26 being free of the at least a pair of tabs 36. As the strap 28 is moved through the head 12 in the inward direction 62, with the release member 114 in the interference position 116, the leading surface 100 of each of the teeth 30 engages the biasing surface 110 of either of the tabs 36. The angled leading surface 100 of the teeth 30 in turn biases the tabs 36 in an upward direction and into the release position 118, such that the teeth 30 can pass by the tabs 36 and allow the strap 28 to be tightened by moving the strap 28 in the inward direction 62. After the particular tooth 30 passes by one of the tabs 36, the tabs are no longer biased by the leading surface 100 and the tabs 36 are biased back to the interference position 116. The tabs 36 again selectively prevent the lateral movement of the teeth 30 and the strap 28 through the cavity 26 in the outward direction 66, as will be more fully described below. In this manner, the strap 28 can be tightened without manually operating the release member 114.

As further shown in FIGS. 7-9, each of the pair of tabs 36 also includes an engaging surface 130 that is substantially normal to the top 16 of the head 12. The engaging surface 130 of each of the tabs 36 cooperates with the trailing surface 102 of each of the teeth 30 to selectively prevent the movement of the strap 28 through the cavity 26 in the outward direction 66. When the tabs 36 are in the interference position 116, the engaging surface 130 of the tabs 36 and the trailing surface 102 of the teeth 30 that are positioned proximate the tabs 36 are substantially parallel. In this manner, the trailing edge of the teeth 30 is substantially unable to bias the tabs 36 in an upward direction as the strap 28 is moved in the outward direction 66, thereby selectively preventing the movement of the strap 28 in the outward direction 66.

As illustrated in FIGS. 7 and 8, the pair of tabs 36 being spaced apart at half the distance that the teeth 30 are spaced apart enables the user to tighten the adjustable clamp 10 in half increments. When a given tooth 30 engages the first of the pair of tabs 36, the trailing surface 102 of the tooth engages the engaging surface of the first tab 36 to define a first engaging position 104 between the teeth 30 and tabs 36 (shown in FIG. 7). As the strap 28 is inserted further into the head 12 in the inward direction 62, the trailing surface 102 of the tooth 30 engages the engaging surface 130 of the second tab 36 to define a second engaging position 106 (shown in FIG. 8). The first and second engaging positions 104, 106 at each tooth 30 and the tabs 36 provides for finite adjustment of the strap 28 that can substantially prevent crushing or other damage to one or both of the tubular members 56, 60 through over tightening of the adjustable strap 10.

Referring again to FIGS. 2 and 6, each of the teeth 30 can include an angled tooth edge 120, wherein the angled tooth edges 120 are disposed at the predetermined angle α to cooperate with the tool 40 disposed in the aperture 38, wherein the angle α is selected to optimize the engagement between the tool 40 and the teeth 30. In such an embodiment, each of the teeth 30 taper from one side of the strap 28 to the other to account for the angled tooth edge 120. In this manner, one side of each tooth 30 has a thickness that is greater than the other side of each tooth 30. Similarly, each of the tabs 36 can include an angled tab edge 122 that is also angled at the predetermined angle α so that the tabs 36 can cooperatively and selectively control the lateral movement of the strap 28 through the cavity 26 of the head 12.

Referring again to FIGS. 7-9, in order to loosen the strap 28 around the tubular members 56, 60 to be secured, or otherwise move the strap 28 through the head 12 in the outward direction 66, the release member 114 can be manipulated at the thinned portion 112, such that the tabs 36 are moved in an upward direction to the release position 118. In this manner, the strap 28 can move through the head 12 in the outward direction 66 without engaging or being substantially impeded by the tabs 36. The thinned portion 112 of the head 12 that permits the movement of the release member 114 can take the form of a thinner portion of plastic that is more flexible than the remainder of the head 12 and is at least partially separated from the front 18 and the back 20 of the head 12 such that the release member 114 can be moved to place the tabs 36 in either the interference or release positions 116, 118. In alternate embodiments, the thinned portion 112 can be a portion of the first side 22 of the head 12 that is not connected to the front 18 and/or back 20 of the head 12 and is, therefore, allowed to move independent of the front 18 and the back 20 between the interference release positions 116, 118. In still other alternate embodiments, the release member 114 can be a portion of the head 12 that can be pinched, distorted, or otherwise manipulated to change the position of the tabs 36 relative to the plurality of teeth 30 to define the interference and release positions 116, 118 of the tabs 36. In various other alternate embodiments, multiple pairs of tabs 36 or sets of tabs 36 that can include three or more tabs 36 can be included to provide varying degrees of finite movement of the strap 28 through the head 12.

In various alternate embodiments, the head 12 of the adjustable strap 10 can include one aperture 38 in the front 18 and a second aperture 38 in the back 20, wherein the head 12 also includes support portions 80 within the front and back 18, 20 of the head 12 and two opposing guide surfaces 90 proximate each aperture 38. According to such an embodiment, the tool 40 can be placed into either aperture 38 at the predetermined angle α to engage the teeth 30 of the strap 28. In this manner, the tool 40 can be placed within either side of the head 12 to tighten the adjustable clamp 10 for added convenience during use.

According to the various embodiments, the adjustable clamp 10 is made from plastic and can be formed from a single integral piece. Alternatively, the adjustable clamp 10 can be made from a plurality of members that are coupled together to form the adjustable clamp 10.

According to the illustrated embodiments, as illustrated in FIGS. 2 and 6, the tool 40 is a No. 2 Phillips screwdriver, which includes a cylindrical shank 140 having an angled end 72 that extends from a tip 142 of the shank 140 at a 26.5° angle relative to a longitudinal axis of the shank 140. Four equally-spaced tapered flutes 144 extend from the tip 142 of the shank 140, wherein the tapered flutes 144 define the four equally spaced vanes 70 that extend from the tip 142 to a portion of the shank 140 distal from the angled end 72, and wherein the diameter of the shank 140 distal from the angled end 72 is 0.25". In various other alternate embodiments, the strap 28 can be configured to use different tools 40 that can require different predetermined angles in order to create the rack-and-pinion relationship between the tool 40 and the teeth 30 of the strap 28. The dimensions of the aperture 38, the support portion 80, the guide surface 90, and the distances between the trailing surfaces 102 of each of the plurality of teeth 30 can be modified to accommodate the dimensions of the particular tool 40 to be used to adjust the lateral position of the strap 28 within the head 12.

Referring again to FIG. 6, the predetermined angle α of the tool 40 being inserted within the aperture 38 to engage the plurality of teeth 30 disposed within the head 12 can be between about 5° and about 45°. Depending upon the configuration of the head 12, the predetermined angle α may be between about 15° and about 40°. In alternate embodiments, the predetermined angle α may be within the range of about 20° and about 36° or, alternatively, within the range of about 24° and about 30°. The predetermined angle α can also vary depending on the tool 40 used to engage the teeth 30 of the strap 28.

Figure 10:
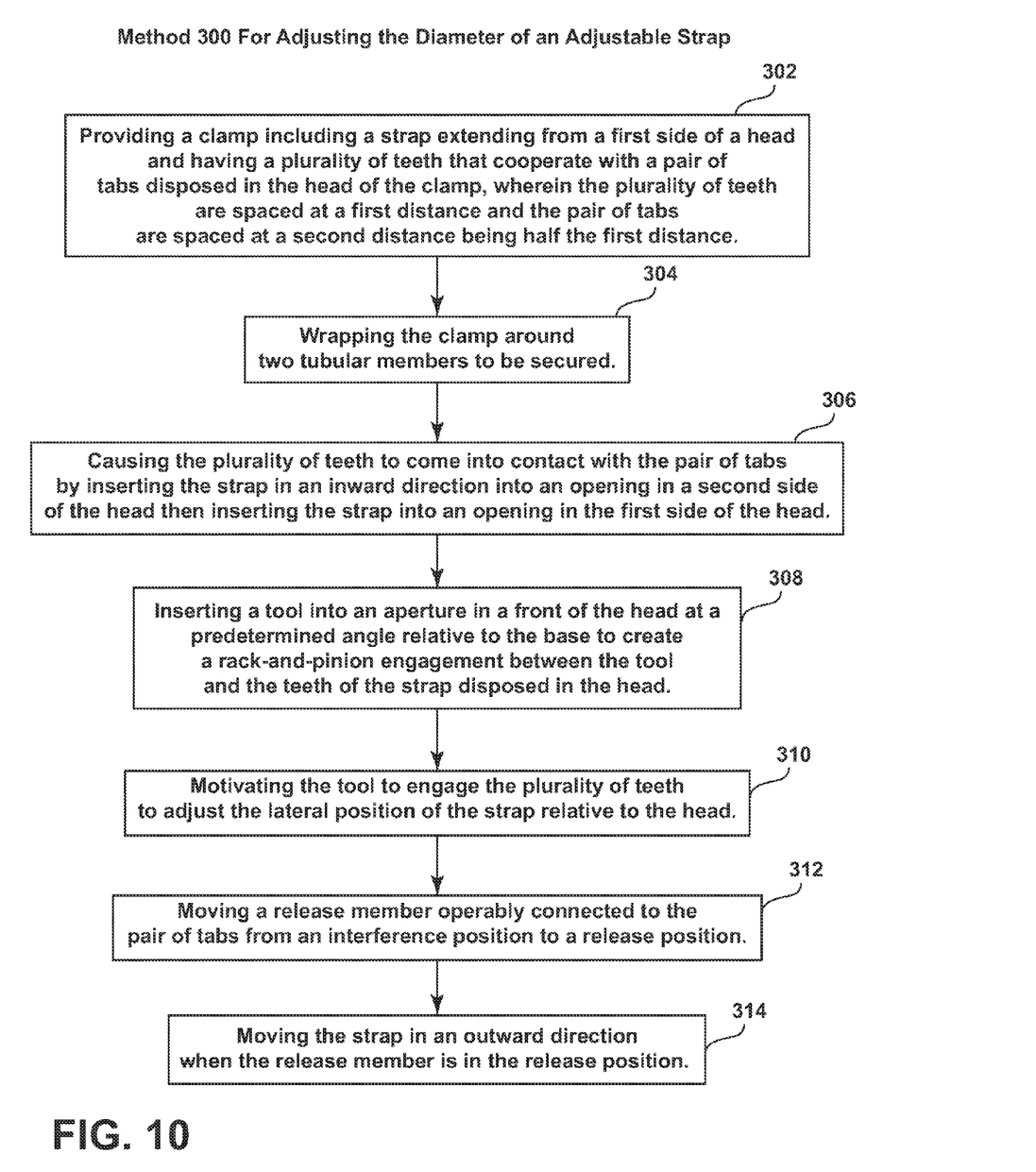
FIG. 10 is a flow diagram for a method 300 for adjusting the diameter of an adjustable strap.

Referring now to FIG. 10, the flow chart describes a method 300 for installing and adjusting an adjustable clamp 10 according to the embodiments described above. The method 300 includes the step 302 of providing an adjustable clamp 10 according to the embodiment described above. According to step 304, the adjustable clamp 10 is wrapped around an object, wherein the object is typically a round or otherwise arcuate tubular member 56 disposed around a similarly shaped tubular member 60. Step 306 includes causing the plurality of teeth 30 of the strap 28 to come into contact with the pair of tabs 36 by inserting and end 68 of the strap 28 into the opening 34 on the second side 24 of the head 12 and then inserting the strap 28 into the opening 34 on the first side 22 of the head 12, where the strap 28 is attached to the head 12. Step 308 includes inserting a tool 40 into the aperture 38 of the head 12 at the predetermined angle α relative to the base 14 of the head 12, wherein the tool 40 abuts the guide surface 90 of the head 12 having the same predetermined angle α, and wherein the selective engagement of the tool 40 within the aperture 38 at the predetermined angle α with the plurality of teeth 30 defines a selectively adjustable rack-and-pinion connection. Step 310 includes motivating the tool 40 to engage the plurality of teeth 30 of the strap 28 to adjust the lateral position of the strap 28 relative to the head 12. Step 312 includes moving a release member 114 that is operably connected to the tabs 36 wherein the movement of the release member 114 changes the position of the tabs 36 from the interference position to the release position 116, 118. The interference position 116 is defined by the pair of tabs 36 at least partially interfering with the selected movement of the strap 28 through the head 12. The release position 118 is defined by the selective movement of the strap 28 through the head 12 being free of the pair of tabs 36. Step 314 includes moving the strap 28 in the outward position when the release member 114 is in the release position 118.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

The invention claimed is:

1. An adjustable clamp having a tool-motivated adjustment mechanism, the adjustable clamp comprising:
   a head having a base, a top, a front, a first side and a second side that cooperate to define a cavity;
   a strap extending from the head, the strap having a plurality of teeth on at least one surface of the strap, wherein the plurality of teeth are spaced a first distance from one another;

the first side and the second side of the head each having an opening configured to allow the strap to extend therethrough;
at least a pair of tabs depending from the head, wherein the at least a pair of tabs are spaced a second distance from one another, the second distance being less than the first distance, and wherein the at least a pair of tabs are configured to selectively engage at least one of the plurality of teeth; and
an aperture within the head configured to allow entry of a tool therethrough at a predetermined angle relative to the base of the head so as to engage at least one of the plurality of teeth selectively disposed in the cavity such that the rotational movement of a tool in at least one direction selectively changes the position of the strap relative to the head.

2. The adjustable clamp of claim 1, wherein the at least a pair of tabs are located within the cavity of the head, and wherein the strap extends from a select one of the first side and the second side of the head.

3. The adjustable clamp of claim 1, wherein the clamp is a single integral piece.

4. The adjustable clamp of claim 1, further comprising:
a release member in operable communication with the at least a pair of tabs, wherein the at least a pair of tabs are disposed proximate the opening of one of the first and second sides, and wherein the release member is operable between an interference position defined by the at least a pair of tabs at least partially interfering with the selective movement of the strap through the cavity, and a release position defined by the selective movement of the strap through the cavity being free of the at least a pair of tabs.

5. The adjustable clamp of claim 1, wherein the head includes a support portion proximate the aperture configured to support a tool placed within the aperture at the predetermined angle, and wherein the predetermined angle is within the range of between about 20° and about 36°.

6. The adjustable clamp of claim 5, wherein at least a portion of an inner surface of the head includes a guide surface disposed at the predetermined angle, and wherein the predetermined angle is within the range of between about 24° and about 30°.

7. The adjustable clamp of claim 1, wherein each of the plurality of teeth includes an angled leading surface configured to displace the at least a pair of tabs when the strap passes into one of the openings and through the cavity in an inward direction, and wherein each of the plurality of teeth includes a trailing surface substantially normal to the at least one surface of the strap and configured to engage at least one of the at least a pair of tabs to selectively prevent the movement of the strap in an outward direction, wherein the outward direction is opposite to the inward direction, and wherein the trailing surface is further configured to cooperate with a tool to permit lateral adjustment of the strap in the inward direction when a tool is disposed within the aperture at the predetermined angle.

8. The adjustable clamp of claim 7, wherein each of the at least a pair of tabs includes an angled biasing surface that cooperates with the leading surface to displace the at least a pair of tabs when the strap is moved through the cavity in the inward direction, and wherein each of the at least a pair of tabs includes an engaging surface substantially normal to the top of the head that cooperates with the trailing surface to selectively prevent the movement of the strap through the cavity in the outward direction.

9. The adjustable clamp of claim 1, wherein a tool includes a cylindrical shank having an angled end extending from a tip of the shank at a 26.5° angle relative to a longitudinal axis of the shank and four equally-spaced tapered flutes extending from the tip of the shank, wherein the tapered flutes define four equally-spaced vanes that extend from the tip to a portion of the shank distal from angled end, and wherein the diameter of the shank distal from the angled end is 0.25 inches, and wherein the selective engagement of the tool with the teeth disposed in the cavity defines a rack-and-pinion connection between the vanes and the plurality of teeth when the tool is disposed within the aperture at the predetermined angle, wherein the predetermined angle is between about 5° and about 40°.

10. The adjustable clamp of claim 1, wherein the second distance is about half of the first distance.

11. An adjustable clamp comprising:
a head having a front, a first side, and a second side, wherein the front includes an aperture;
a strap extending from the first side of the head, the strap having teeth on at least one surface, wherein the teeth are spaced a first distance from one another, and wherein the aperture of the front is configured to allow entry of a tool therein at a predetermined angle relative to a base of the head to selectively engage the teeth of the strap in a rack-and-pinion configuration, and wherein the predetermined angle is between about 15° and about 40°; and
openings of the first and second sides, wherein the openings are sized to allow the strap to extend therethrough such that the teeth engage at least a portion of the head to define a selective interference connection.

12. The adjustable clamp of claim 11, wherein a tool includes a cylindrical shank having an angled end extending from a tip of the shank at a 26.5° angle relative to a longitudinal axis of the shank and four equally-spaced tapered flutes extending from the tip of the shank, wherein the tapered flutes define four equally-spaced vanes that extend from the tip to a portion of the shank distal from angled end, and wherein the diameter of the shank distal from the angled end is 0.25 inches, and wherein the selective engagement of the tool with the teeth defines a rack-and-pinion connection between the vanes and the teeth when the tool is inserted in the aperture at the predetermined angle, wherein the predetermined angle is between about 20° and about 35°.

13. The adjustable clamp of claim 11, wherein the front includes a support portion proximate the aperture configured to guide a tool placed within the aperture at the predetermined angle, and wherein at least a portion of the inner surface of the head includes a guide surface disposed at the predetermined angle, and wherein the predetermined angle is within the range of between about 24° and about 30°.

14. The adjustable clamp of claim 11, wherein the at least a portion of the head comprises two tabs depending from the inner surface of the head that are configured to selectively engage at least one of the teeth when the strap is selectively disposed in the openings of the first and second sides, the two tabs being spaced a second distance from one another, and wherein the second distance is about half the first distance, and wherein the clamp is a single integral piece.

15. The adjustable clamp of claim 14, wherein the second distance is about half of the first distance.

16. The adjustable clamp of claim 14, further comprising:
a release member in operable communication with the two tabs, wherein the release member is operable between an interference position defined by the two tabs at least partially interfering with the selective movement of the strap through the openings of the first and second sides, and a release position defined by the selective movement of the strap through the openings of the first and second sides being free of the two tabs.

17. The adjustable clamp of claim 11, wherein each of the teeth includes an angled leading surface configured to bias the two tabs upward when the strap passes into and through the openings in an inward direction, and wherein each of the teeth includes a trailing surface substantially normal to the at least one surface of the strap and configured to engage at least one of the two tabs to selectively prevent the movement of the strap through the openings in an outward direction, and wherein the outward direction is opposite to the inward direction.

18. The adjustable clamp of claim 17, wherein each of the two tabs includes an angled biasing surface that cooperates with the leading surface to displace the two tabs when the strap is moved through the openings in the inward direction, and wherein each of the two tabs includes an engaging surface that cooperates with the trailing surface to selectively prevent the movement of the strap through the openings in the outward direction, and wherein the trailing surface is further configured to cooperate with a tool to permit lateral adjustment of the strap relative to the head in the inward direction when a tool is disposed in the aperture at the predetermined angle.

19. A method of adjusting a clamp, comprising the steps of:
providing a clamp comprising:
a head having a base, a top, a front having an aperture, a first side, and a second side, wherein the first and second sides each include an opening;
a strap extending from the head, the strap having a plurality of teeth on at least one surface of the strap, wherein the plurality of teeth are spaced a first distance from one another, and wherein the first and second sides each have an opening sized so that the strap can extend therethrough; and
at least a pair of tabs depending from the head proximate the opening of one of the first and second sides, wherein the at least a pair of tabs are spaced a second distance, the second distance being about half the first distance, and wherein the at least a pair of tabs are configured to selectively engage at least one of the plurality of teeth;
wrapping the clamp around an object;
causing the plurality of teeth of the strap to come in contact with the at least a pair of tabs by inserting the strap into the opening of the second side of the head, then inserting the strap into the opening of the first side of the head;
inserting a tool into the aperture at a predetermined angle relative to the base of the head, wherein the tool abuts a guide surface of the head disposed at the predetermined angle, and wherein the selective engagement of the tool within the aperture at the predetermined angle with the plurality of teeth defines a selectively adjustable rack-and-pinion connection; and
engaging the plurality of teeth of the strap with the tool to adjust the position of the strap relative to the head.

20. The method of claim 19, wherein the tool includes a cylindrical shank having an angled end extending from a tip of the shank at a 26.5° angle relative to a longitudinal axis of the shank and four equally-spaced tapered flutes extending from the tip of the shank, wherein the tapered flutes define four equally-spaced vanes that extend from the tip to a portion of the shank distal from the angled end, and wherein the diameter of the shank distal from the angled end is 0.25 inches, and wherein the predetermined angle is between about 5° and about 40°.

21. The method of claim 19, wherein each of the plurality of teeth includes an angled leading surface configured to displace the at least a pair of tabs when the strap passes into and through the openings in an inward direction, and wherein each of the plurality of teeth includes a trailing surface substantially normal to the at least one surface of the strap configured to engage at least one of the at least a pair of tabs to selectively prevent the movement of the strap through and out of the openings in an outward direction, wherein the outward direction is opposite to the inward direction, and wherein the trailing surface is further configured to cooperate with the tool such that the rotational movement of the tool in one direction selectively alters the lateral position of the strap relative to the head in the inward direction when the tool is disposed in the aperture at the predetermined angle.

22. The method of claim 21, further comprising the steps of:
moving a release member operably connected to the at least a pair of tabs from an interference position defined by the at least a pair of tabs at least partially interfering with the selective movement of the strap through the head, to a release position defined by the selective movement of the strap through the head being free of the at least a pair of tabs; and
moving the strap in the outward direction when the release member is in the release position.

* * * * *